United States Patent Office 3,250,731
Patented May 10, 1966

3,250,731
PREPARATION OF CELLULAR POLYPROPYLENE ARTICLES BY EXTRUSION
Frank C. Buhl, Wilmington, and George B. Feild, New Castle, Del., assignors to Hercules Powder Company, Wilmington, Del., a corporation of Delaware
No Drawing. Filed Oct. 15, 1962, Ser. No. 230,732
The portion of the term of the patent subsequent to June 16, 1981, has been disclaimed
5 Claims. (Cl. 260—2.5)

This invention relates to a process of producing a low density, uniform closed cell polypropylene foam by extrusion procedures and to wire coated with such foams.

It is well known that foams of many thermoplastic materials can be extruded into the shapes of sheets, rods, tubes, and coatings on wire and rods, etc. Among the thermoplastic materials used for these purposes have been polystyrene and polyethylene. However, both of these materials suffer from disadvantages for many applications. Thus, in the electrical insulation field, polystyrene foams have good dielectric properties but are too brittle for use as wire coatings and as unprotected sheets for thermal insulation. Addition of plasticizers, etc., reduces the brittleness but, at the same time, adversely affects the mechanical properties of the foam. Polyethylene foams, on the other hand, have excellent dielectric and mechanical properties but are too soft for many applications and have an insufficient resistance to crushing, etc. Attempts have recently been made to utilize the new thermoplastic polypropylene. However, it has not been possible to apply these extrusion procedures to the production of low density polypropylene foams due to rupture of the cell walls during expansion at the elevated temperatures required for such extrusion procedures and to collapse of the foam on cooling. The rupture of cell walls during expansion results in nonuniform, highly porous and predominantly open cell structures. Even in the case of the high density foams, a large percentage of cells are ruptured and open. Collapse of cell walls during cooling prevents the attainment of low density polypropylene foams.

Now in accordance with this invention it has been discovered that polypropylene foams can be formed by means of extrusion procedures into the shape of sheets, rods, tubes, wire and cable coatings, etc., and obtain a foam of any desired density having a uniform closed cell structure with at least 50% of the cells closed by mixing a stereoregular polypropylene with a blowing agent and an azido cross-linking agent and passing the mixture through an extruder at a temperature above the softening temperature of the mixture.

In carrying out the process in accordance with this invention, the stereoregular polypropylene is blended with the blowing agent and the azido cross-linking agent. Any desired means may be used for bringing about this blend. In the case of the chemical blowing agents, the azido cross-linking agent and the blowing agent may be mixed into a diluent such as acetone, which may also contain a stabilizer or other modifier for the polypropylene, and the polypropylene in finely divided form may then be added and mixed into a slurry. On evaporation of the diluent an intimate mixture of the polymer, cross-linking agent, and blowing agent is obtained which may then be used directly in the extruder. The azido cross-linking agent and the chemical blowing agent may also be blended in dry form with the powdered polymer by means of a high-speed mixer such as a Waring blendor or Henschel mill. This dry mix may then be used directly in the extruder. When solvent types of blowing agents are employed, the stereoregular polypropylene and the azido cross-linking agent may be mixed and introduced into the extruder and the solvent blowing agent introduced directly into the extruder barrel through a vent generally located a short distance in front of the die of the extruder. In either case the temperature in the vicinity of the die of the extruder must be at least as high as the softening temperature of the mixture. The softening temperature of this mixture, or blend, will depend upon whether the blowing agent is a solvent type or a chemical type. Thus, with a solvent type, the polypropylene will at least partially dissolve so that the softening temperature of the blend can be as low as 135° C. On the other hand, with a chemical blowing agent, the softening temperature of the blend will be the melting point of the polymer and, hence, will be above about 165° C. Accordingly, the temperature within the extruder must be at least as high as the softening temperature of the mixture passing through the extruder. The exact temperature to be used for the total operation will depend upon the cross-linking and blowing agents used, the residence time in the extruder, etc. When the mixture of polypropylene, cross-linking agent, and blowing agent is heated in the extruder, particularly in the case of an extruder with a temperature gradient, blowing may be at least partially effected at the low temperature in the first zones of the extruder and cross-linking will be effected at the higher temperature in the final zones of the extruder, in which case the cross-linking is effected immediately prior to the expansion that takes place when the mass leaves the extruder at the die. It is essential that the cross-linking must have occurred at the time that expansion takes place at the die of the extruder or simultaneously therewith. Hence, the temperature in the final zone of the extruder must be sufficient to complete the cross-linking of the polypropylene and to release the gas from the blowing agent.

Any stereoregular polypropylene may be used to prepare the extruded foams in accordance with this invention, but generally polypropylenes having a reduced specific viscosity (RSV) of from about 1 to about 5 and, more preferably, about 2 to about 3, are used, said reduced specific viscosity being determined on a 0.1% solution of the polymer in decahydronaphthalene at a temperature of 135° C.

Any of the well-known chemical blowing agents may be used in the preparation of the foams in accordance with this invention as, for example, azo bis(formamide), diazoaminobenzene, N,N'-dinitrosopentamethylene tetramine, N,N'-dimethyl-N,N'-dinitrosoterephthalamide, p,p'-oxy-bis(benzene sulfonyl semicarbazide), azo bis(isobutyronitrile), p,p',oxy-bis(benzene sulfonyl hydrazide), p, p'-diphenyl-bis(sulfonyl hydrazide), benzene-sulfonyl hydrazide, m-benzene-bis(sulfonyl hydrazide), etc. Any of the well-known solvent blowing agents may also be used in this invention as, for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at least one mole of gas per mole of blowing agent at a temperature of 190° C. or less may be used.

Any azido cross-linking agent may be used in the preparation of the extruded polypropylene foams in the process of this invention. Thus, any poly(sulfonazide), i.e., any compound having the general formula $$R[SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10-decane-bis(sulfonazide), 1,11-undecane-bis(sulfonazide), 1,12 - dodecane - bis(sulfonazide), 7-oxa-tridecane-1,13-bis(sulfonazide), 6-thiaundecane-1,11-bis(sulfonazide); chloroaliphatic poly(sulfonazide)s such as the poly(sulfonazide) produced from a chloro- and sulfochlorinated mixture of petroleum hydrocarbons and containing at least one chlorine atom and at least two sulfonazide groups per molecule; 1,9,18-octadecane-tris(sulfonazide, poly(ethylene sulfonazide), poly(sulfonazido-methyl styrene), 1,3- and 1,4-bis(sulfonazido-methyl benzene), 1,3-benzene bis(sulfonazide), 1-octyl-2,4,6-benzene tris(sulfonazide), 4,4'-diphenylmethane bis(sulfonazide), 4,4'-diphenyl ether bis(sulfonazide), 4,4'-bis-octadecyl biphenyl-3,5,3',5'-tetra(sulfonazide), 4,4'-diphenyl disulfide bis(sulfonazide), 1,6-bis(4'-sulfonazidophenyl) hexane, 2,7-naphthalene bis(sulfonazide), etc. Another class of azido cross-linking agents that may be used are azidoformates which have the general formula

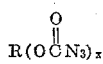

where $x$ is at least 1, preferably from about 1 to about 100, and R is an organic radical, inert to cross-linking reactions, containing at least one carbon atom per azidoformate group. Exemplary of these azidoformates are the alkyl azidoformates such as n-octadecyl azidoformate, tetramethylene - bis(azidoformate), pentamethylene-bis(azidoformate); the cyclic alkyl azidoformates such as 2-(1-p-methyl-8-yloxy) ethyl azidoformate; the aromatic azidoformates such as phenyl azidoformate, α,α'-p-xylylene-bis(azidoformate), 2,2-isopropylidene-bis(p,p'-phenyl azidoformate); the azidoformate ethers such as 2,2'-oxydiethyl-bis(azidoformate), 2,2' - oxydipropyl - bis(azidoformate), 2,2'-ethylenedioxydiethyl - bis(azidoformate), the tetraazidoformate of pentaerythritol-propylene oxide adduct, the azidoformate thioethers such as 2,2'-thiodiethyl-bis(azidoformate), 4,4'-thiodibutyl - bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6-triazidobenzene, 4,4'-diphenyl diazide, 4,4'-diphenylmethane diazide, 4,4'-diazido diphenylamine, 4,4'-diazido diphenylsulfone, 2,7-diazidonaphthalene and 2,6-diazidoanthraquinone. Thus, any compound having at least one azido group in the molecule and preferably two or more can be used as the azido cross-linking agent to prepare the extruded polypropylene foams of this invention.

The amount of the azido cross-linking agent utilized in the preparation of these cellular polypropylene materials can be varied over a wide range. It must be an amount that is sufficient to prevent rupture of the cell walls when the foaming action takes place. Generally, it will be an amount of from about 0.01% for a final foam of 40 to 50 lbs./cu. ft. density up to about 2% by weight of the polymer for foams below 5 lbs./cu. ft. density, although higher concentrations can be used if desired. The amount of blowing agent incorporated will obviously depend upon the degree of blowing desired; that is, the density desired for the final foamed product and the types of blowing agent used.

Many variations can be made in the process of this invention and in the extruded compositions of this invention without departing from the invention. Thus, there can be incorporated in the polypropylene used or in the preparation of the blends of polypropylene, blowing agent, and cross-linking agent, such additives as light and heat stabilizers for the polypropylene, dyestuffs and pigments, flame retardants, including organic and inorganic flame retardants, such as chlorinated paraffin wax, antimony oxide and other such materials, etc. For many applications it is desirable to increase the flexibility of the extruded foams by incorporating in the foam an elastomer. This may be done by mixing a synthetic or natural rubber with the blend of polypropylene, cross-linking agent and blowing agent and extruding said mixture. Exemplary of the elastomers that can be so incorporated are ethylene-propylene copolymer rubbers, ethylene-propylene-diene terpolymer rubbers, polyisobutylene, etc. Many other variations will be apparent to those skilled in the art.

The following examples will illustrate the preparation of extruded cross-linked polypropylene foams in accordance with this invention. All parts and percentages are by weight unless otherwise indicated.

*Example 1*

A dry blend of 100 parts of stereoregular polypropylene having an RSV of 2.4, 1 part of azo bis(formamide) and 0.1 part of 1,10-decane-bis(sulfonazide) was extruded, through a 1¼-inch extruder with a temperature profile of 149° C. in the first zone and 200° C. in the second and third zones, through a six-inch slit die at 210° C., and into a water bath about 4 inches away. The resulting foamed sheet was completely foamed and had a fine closed cell structure with greater than 70% of the cells closed. It had an approximate density of 30 lbs./cu. ft.

*Example 2*

A mixture of 100 parts of stereoregular polypropylene having an RSV of 2.7, 0.1 part of tetramethylene bis-(azidoformate) as cross-linking agent, and 1.0 part of azo bis(formamide) as blowing agent, was blended on a two-roll mill for 5 minutes at 166° C. After cooling, the milled blend was chopped in a plastic cutter to a nominal particle size of ⅛ inch diameter. The particles were then fed into a 1-inch, 6:1 ratio (length-diameter) extruder with barrel and die heated to 216° C. and operating at low speed. The extruded strand was collected in 6- to 8-inch lengths and allowed to cool in air. The foamed strands so prepared had a uniform closed cell structure and an approximate density of 30 lbs./cu. ft.

When the example was duplicated, except that the tetramethylene bis(azidoformate) cross-linker was omitted, the foamed strands had a very nonuniform structure and an approximate density of 37 lbs./cu. ft.

*Example 3*

A dry blend of 100 parts of stereoregular polypropylene having an RSV of 2.7, 0.75 part of azo bis(formamide) and 0.1 part of 1,10-decane-bis(sulfonazide) was fed into an extruder operating with a temperature profile of 177° C. at the feed end and 204° at the die. The plastified material was fed into a wire coating die where it was deposited on 14-gage wire which had been preheated to 190° C. and travelling at 500 ft./min. After emerging from the die, the coated wire travelled 4 to 5 inches through ambient air to a water bath heated to 80° C. Foaming of the coating was largely completed by the time the wire emerged from the die. The resulting foamed insulation had a density of approximately 30 lbs./cu. ft. and possessed a fine and closed cell structure in which more than 70% of the cells were closed. When wire was coated by the same procedure, but omitting the cross-linking agent, such a low density could not be obtained with this high level of closed cells.

*Example 4*

A mixture of 85 parts of stereoregular polypropylene, having an RSV of 2.5, 15 parts of polyisobutylene (molecular weight of about 100,000), 0.5 part of azo bis(formamide), 0.05 part of 1,10-decane-bis(sulfonazide) and 0.20 part of Santonox [4,4'-thiobis(6-tert-butyl-m-cresol)]

as a stabilizer was placed on a two-roll mill at 166° C. and mixed for 10 minutes with repeated cross-cutting and end-rolling. The blend was then sheeted from the mill, cooled and chopped into granules.

These pellets were fed into an extruder operating with a temperature profile of 180° C. at the feed end and 210° C. at the die. The plastified material was fed into a wire coating die where it was deposited onto 20-gage wire which had been preheated to 190° C. and travelling at 500 ft./min. After emerging from the die, the coated wire travelled through 4 to 5 inches of air to an 80° C. water bath. The resulting foamed insulation had a density of approximately 35 lbs./cu. ft. and had a fine, closed cell structure with more than 70% of the cells closed.

Following the procedure described for the preparation of foamed sheets and using dies with suitable dimensions, sheets of varying thickness can be produced. Such sheets find utility in a variety of applications such as thermal insulations in environments where exposures to elevated temperatures and/or organic solvents would be encountered. The excellent physical properties imparted by the closed cells of these sheets make them useful in thinner dimensions as water-resistant substitutes for cardboard and in such applications as folding cartons and other packaging applications, notebook covers, etc. These extruded sheets may be shaped by any of the well-known techniques such as thermoforming, vacuum-forming, etc.

Wire and cable coatings produced as exemplified above have improved dielectric and physical properties as a result of their more uniform closed cell structures. For use in wire coating and other electrical conductor insulations, the foams will preferably have at least 70% of the cells closed and densities of less than 40 lbs./cut. ft. These coatings will preferably have densities below about 35 lbs./cu. ft. and are capable of being employed at much lower densities, which improves the dielectric properties, flexibility, and offers economies in the production of coated wire and cable.

What we claim and desire to protect by Letters Patent is:

1. The process of preparing extruded low density polypropylene foams with a uniform closed cell structure in which at least 50% of the cells are closed, which comprises heating a mixture of stereoregular polypropylene, a blowing agent which yields at least one mole of gas per mole of blowing agent at a temperature within the range of from the softening temperature of said mixture to about 190° C., and from about 0.01% to about 2%, based on the weight of the polypropylene, of a poly(azidoformate) which decomposes at a temperature within the range of from the softening temperature of said mixture to about 190° C., in an extruder to at least the softening temperature of the mixture and extruding said mixture into a desired shape.

2. The process of claim 1 wherein the mixture is extruded through a slot die to form a sheet of foam.

3. The process of claim 1 wherein the mixture is extruded onto an electrical conductor.

4. The process of claim 3 wherein the electrical conductor is wire.

5. The process of claim 1 wherein the poly(azidoformate) is tetramethylene bis(azidoformate).

References Cited by the Examiner
UNITED STATES PATENTS

| | | | |
|---|---|---|---|
| 2,518,249 | 8/1950 | Ott | 260—2.5 |
| 2,532,243 | 11/1950 | Ott | 260—2.5 |
| 2,678,293 | 5/1954 | McMillan et al. | 260—2.5 |
| 2,830,029 | 4/1958 | Adams | 260—2.5 |
| 2,927,904 | 3/1960 | Cooper | 260—2.5 |
| 3,017,371 | 1/1962 | Hohenberg et al. | 260—2.5 |
| 3,058,944 | 10/1962 | Breslow et al. | 260—2.5 |
| 3,072,972 | 1/1963 | Yokese | 260—2.5 |
| 3,137,745 | 6/1964 | Johnstone | 260—2.5 |

MURRAY TILLMAN, *Primary Examiner.*

LEON J. BERCOVITZ, *Examiner.*